Aug. 12, 1958 D. BUCCICONE 2,847,111
METAL SHEET HANDLING APPARATUS
Filed April 2, 1957 3 Sheets-Sheet 1
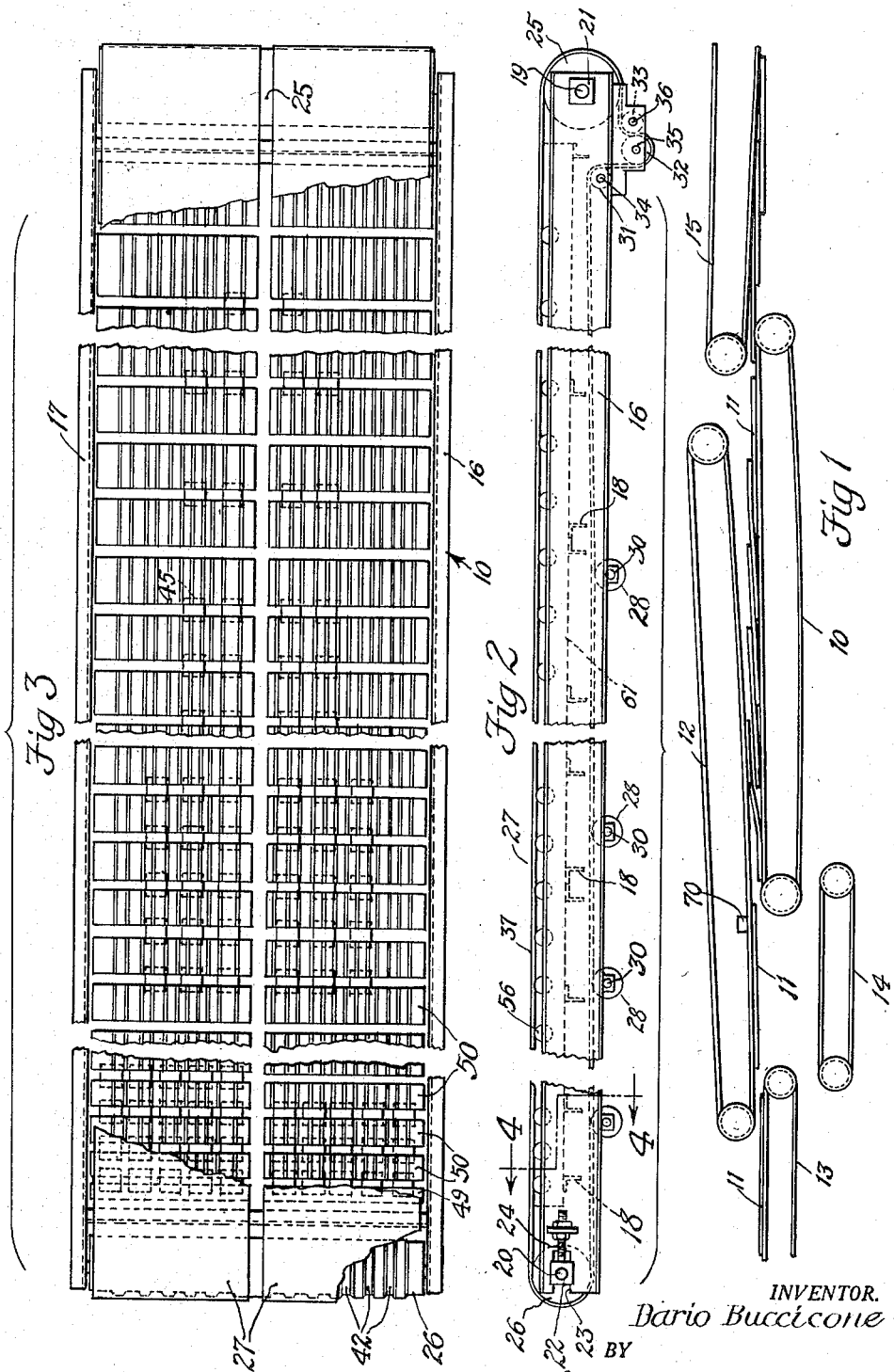
INVENTOR.
Dario Buccicone
BY
Cromwell Greist & Warden
Atty's.

Aug. 12, 1958  D. BUCCICONE  2,847,111
METAL SHEET HANDLING APPARATUS
Filed April 2, 1957  3 Sheets-Sheet 2

INVENTOR.
Dario Buccicone
BY
Cromwell Greist + Warden
Atty's.

Aug. 12, 1958 D. BUCCICONE 2,847,111
METAL SHEET HANDLING APPARATUS
Filed April 2, 1957 3 Sheets-Sheet 3

INVENTOR
Dario Buccicone
BY
Cromwell Greist + Warden
Atty's.

United States Patent Office 2,847,111
Patented Aug. 12, 1958

2,847,111

METAL SHEET HANDLING APPARATUS

Dario Buccicone, Gary, Ind., assignor to Bucciconi Engineering Company, Inc., Gary, Ind., a corporation of Indiana Application April 2, 1957, Serial No. 650,180

12 Claims. (Cl. 198—41)

This invention relates to apparatus for handling metal sheets after they have been sheared in a high speed processing line and is more particularly concerned with improvements in a magnetic conveyor which is adapted for use in transferring the sheets in lapped relation to a sheet piling apparatus or other sheet handling equipment.

In modern mills for producing sheet metal continuous shears are employed which are capable of delivering cut sheets at a rate of speed which requires the use of mechanical conveying and piling equipment operating at relatively high speeds. One type of equipment which is in use in sheet metal processing lines including conveyors which employ magnetic force for holding the sheets on the conveyor and preventing movement of the same while they are carried thereon. Such conveyors which employ the principle of placing electromagnets behind a moving belt have proven satisfactory for many operations. However, it has been found that a conveyor of this type which is of substantial size and length involves the use of a belt having substantial thickness, which poses a number of problems somewhat difficult to solve. When a belt is employed which is of sufficient thickness to be practical, the magnets working through the thickness of the belt have insufficient pulling power for efficient operation. It is not feasible to use a very thin belt because of the resulting low belt life and even with a belt of minimum thickness, sufficient magnetic pulling power cannot be obtained for practical operation. One solution to this problem involves the use of apparatus which employs rail-type conveyor units providing a series of relatively narrow parallel belt members with the belts sunk into the poles of the electromagnets so as to provide a relatively small gap between the magnetic poles and the metal sheet which permits the former to exert a relatively high pulling force on the sheet. This type of apparatus is disclosed in Patents Nos. 2,655,248, October 13, 1953, 2,642,174, June 16, 1953, and 2,527,911, October 31, 1950. While such conveyors are satisfactory for most operations, there are situations in which it is desirable to employ a wide belt conveyor. There are advantages in being able to employ a conveyor having a belt which is of substantial width particularly where the sheets are to be carried on the top run of the conveyor belt since the wide belt surface provides increased braking surface which tends to prevent the sheet from sliding when it drops on the belt. Also, when the narrow belt type conveyor is employed in handling relatively wide and thin sheets, there is a tendency for the edges of the sheet to dig into the edges of the belts and substantially reduce the life of the same. It is a principal object, therefore, of the present invention to provide an improved magnetic conveyor for handling metal sheets which permits the use of a belt of substantial width and which is so constructed that relatively high magnetic pulling power is obtained, with efficient use of magnet power, and with a minmium belt drag thereby permitting low horsepower motors to be used to operate the conveyor.

It is a more specific object of the invention to provide a magnetic sheet conveyor in which a relatively wide flat belt surface is provided with portions of the belt having its thickness reduced and with the magnets arranged so that the pulling force is increased in the areas of reduced belt thickness and a high degree of pull is exerted on the sheet.

It is another object of the invention to provide a magnetic conveyor in which a relatively wide flat continuous belt is supported on a series of spaced rollers having magnets associated therewith which are arranged so that the rollers are positioned at the point of direct pull and in which the belt is reduced in thickness in predetermined areas and the magnets are positioned to extend into these areas and provide a minimum gap between the sheet and the magnet poles, whereby relatively high magnetic pulling power is obtained.

It is a further object of the invention to provide a magnetic conveyor having a continuous flat belt surface of substantial width for receiving metal sheets thereon, the belt being longitudinally grooved on its underside to provide spaced areas of reduced thickness and being supported on a series of spaced rollers which extend transversely beneath the belt and which have associated therewith magnets with the ends of their pole pieces positioned immediately beneath the undersurface of the belt and with the pole pieces having raised rib forming portions which extend into the grooves in the belt, the rollers and the pole pieces being positioned so that a minimum of drag on the belt is produced as the latter is advanced across the same.

These and other objects and advantages of the invention will be apparent from a consideration of the conveyor apparatus which is shown by way of illustration in the accompanying drawings wherein:

Figure 1 is a schematic elevation of a sheet handling apparatus having incorporated therein a bottom conveyor for transporting the sheets in lapped relation between two overhead conveyors, which embodies the principal features of the invention;

Figure 2 is a side elevation of the sheet lapping conveyor of Figure 1, with portions broken away;

Figure 3 is a plan view of the lapping conveyor with portions broken away;

Figure 4:
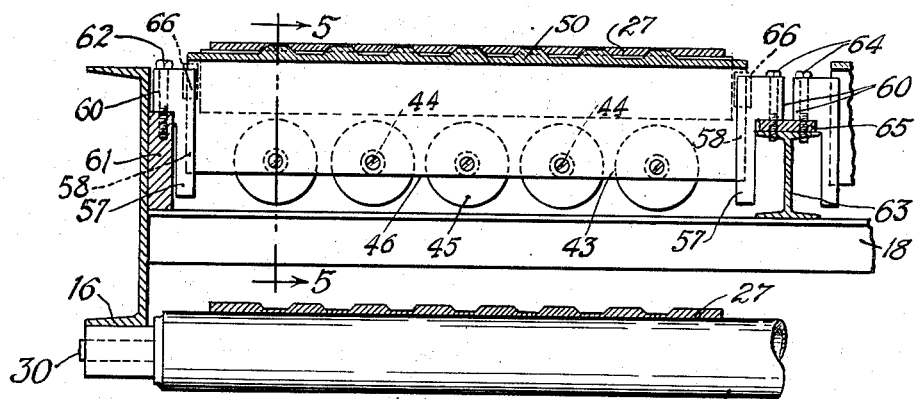
Figure 4 is a partial cross section, to an enlarged scale, taken on the line 4—4 of Figure 2.

Referring to Figure 1 of the drawings, there is illustrated a sheet handling apparatus comprising a series of conveyors arranged to advance successive sheets delivered from a processing line, which apparatus includes a sheet carrying lapping conveyor 10 having incorporated therein the principal features of the invention. The conveyor 10 is arranged horizontally and receives on its uppermost surface metal sheets 11 which are deposited thereon in lapped relation by an overhead magnetic conveyor 12, the latter being preferably made up of one or more rail units of the type illustrated in Patents Nos. 2,655,248, 2,642,174 and 2,527,911. The overhead conveyor 12 receives the metal sheets 11 from a delivery conveyor 13 on which the sheets 11 are deposited from the shear or other portion of the processing line, the speed of these conveyors being determined by the speed of the processing line. In the apparatus illustrated, a reject conveyor 14 may be interposed between the delivery conveyor 13 and the lapping conveyor 10 for receiving imperfect or damaged sheets which may be noted by the operator and deposited thereon by controlling the operation of the magnets at the entrance or receiving end of the conveyor 12. The lapping conveyor 10 is operated at a slower speed than the conveyor 12 and is adapted in the arrangement shown to deliver the sheets in lapped relation to an overhead magnetic conveyor 15 which is spaced in advance of the conveyor 12 and which may deposit the sheets 11 in a piler box (not shown).

The sheet lapping conveyor 10 comprises an elongate rectangular frame structure consisting of side channels or rails 16 and 17 and connecting cross bracing angle or channel members 18 which are arranged in longitudinally spaced relation to provide the frame with the necessary strength and to support the magnet structure. Roller carrying cross shafts 19 and 20 are provided at opposite ends of the side channels 16 and 17 which are suitably supported at their ends in bearing bracket members 21 and 22. Preferably, the bearing members 22 at the one end of the frame are mounted in adjustable longitudinal sliding relation in slots 23 provided in the ends of the side frame channels 16 and 17 and the channel members 16 and 17 are each provided with an adjusting screw 24 which engages with the bearing bracket 22 and which may be operated to vary the longitudinal position of the shaft 20.

Belt supporting or carrying rollers 25 and 26 are mounted on the shafts 19 and 20 and two relatively wide laterally spaced belts 27 of identical construction are carried thereon. The lower return runs of the belts 27 are supported by longitudinally spaced rollers 28 extending transversely of the frame and supported on shafts 30 journaled in suitable bearing members carried by the side frame channel members 16 and 17. Three belt tracking rollers 31, 32 and 33 are provided, which are supported on cross shafts 34, 35 and 36, adjustably mounted adjacent the end roller 25 for controlling the tension in the belts 27.

The top face 37 of each of the belts 27 is flat and may be provided, if desired, with an anti-friction surface or a coating material or the like, to increase the resistance to sliding when the metal sheets or plates 11 are dropped thereon. The bottom face 38 of each belt 27 (Figure 6) is grooved to provide longitudinally extending downwardly opening continuous recesses or grooves 39 of truncated V-shaped cross section separated by rib forming sections 40, also of truncated V-shaped cross section. The thickness of the belt 27 in the cross sectional area 41 between the bottom of the grooves 39 and the top face 37 of the belt is substantially less than the thickness of the same in the area of the rib sections 40.

The belt supporting rollers 25 and 26 at opposite ends of the frame are each provided on their peripheral surface with axially spaced peripheral grooves 42 (Figures 3 and 7) which correspond with the spacing and cross section of the ribs 40 on the bottom faces of the belts 27 and which receive the rib sections 40 and hold the belts against movement in the axial direction of the end supporting rollers 25 and 26, thereby eliminating any problem of belt tracking regardless of the length of the belt.

A series of magnet carrying frames or units 43 are arranged in transversely extending longitudinally spaced relation between the side frame channels 16 and 17. Each of the magnet units or assemblies 43 (Figures 4 to 7) comprises a plurality of magnetic core members 44, five being shown in Figure 4, and associated magnetic coils 45 surrounding the same. The cores or poles 44 extend between a pair of spaced vertical plate members 46 and 47 and are secured thereto by screws 48. The vertical plate members 46 and 47 form extensions of the core or pole members 44 and are positioned to extend vertically and transversely relative to the conveyor side rails 16 and 17. The vertical plate members 46 and 47 carry on their upper edges horizontally disposed plate members 49 and 50 which form further extensions of the magnetic poles 44 over the upper surfaces of which the belts 27 are carried in slightly spaced relation.

Figure 6:
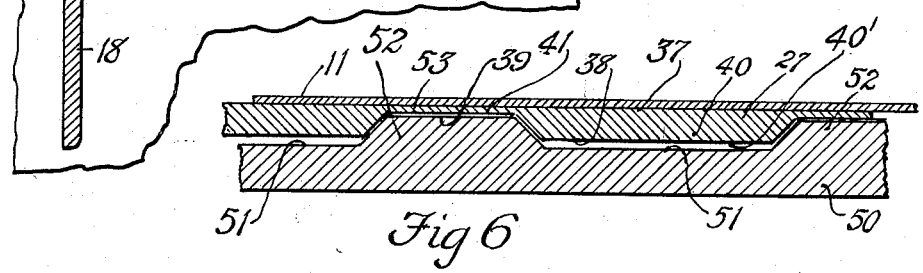
Figure 6 is a fragmentary cross section, to a larger scale, taken on the line 6—6 of Figure 5.
Figure 7:
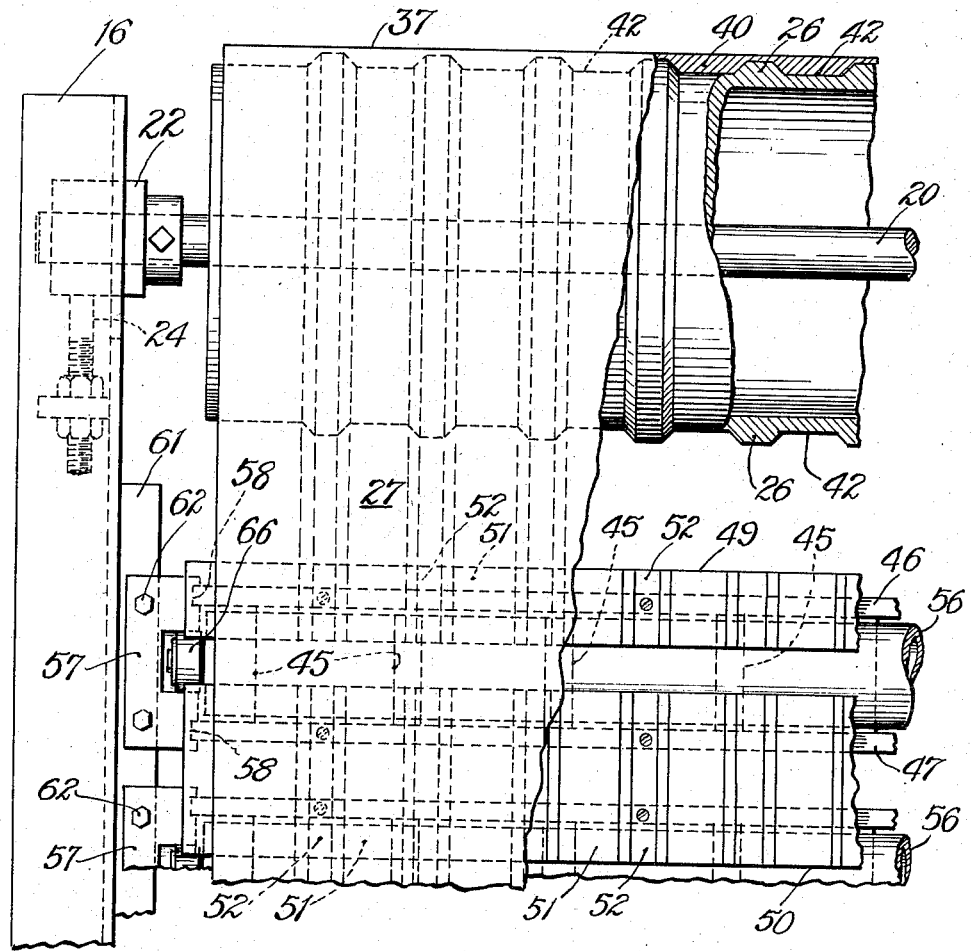
Figure 7 is a plan view, to an enlarged scale and with portions broken away, of a corner of the conveyor as shown in Figure 3.

The horizontal plate members 49 and 50 are identical in cross section. The plate member 49, which is located at the end of the conveyor as shown in Figure 7, is relatively short or narrow while plate member 50 is of sufficient width to connect with the adjacent vertical plate member 46 on the next adjacent magnet unit 43 so as to bridge the gap or space between the two units and serve as a pole piece for both units. As shown in Figure 6, the top face of each of the horizontal plate members 49 and 50 is shaped to provide spaced upwardly opening grooves 51 of truncated V-shaped cross section which are separated by rib formations 52 of inverted truncated V-shaped cross section, the grooves 51 and rib formations 52 being substantially of a cross section corresponding to the cross section of the rib sections 40 and the grooves 39, respectively, of the belts 27, except that the grooves 51 have greater depth than the depth or thickness of the rib sections 40 so as to insure that when the belts 27 move across the plate with the rib formations 52 extending into the grooves 39 thereof the bottom faces 40' of the rib sections 40 of the belts do not engage with the bottom of the grooves 51, thereby avoiding any drag on the belts. The rib formations 52 of the plates 49 and 50 project into the grooves 39 of the belts so as to reduce the space between the uppermost face 53 thereof and the sheet 11 to as near the thickness of the belt in the area 41 as possible. The horizontal plate members 49 and 50 are arranged on the vertical plate members 46 and 47 to provide opposed spaced edges which are cut away at 54 and 55 to accommodate a belt supporting roller 56 which is arranged with its axis of rotation parallel with the long axis of the vertical plate members 46 and 47 and at an elevation to engage in supporting relation with the bottom face 38 of the belt 27, the surface of the roller engaging with the bottom faces 40' of the rib forming sections 40 of the belt 27 in the space between the horizontal plate members 49 and 50. The peripheral surface of the roller 56 engages the undersurfaces 38 of the belts 27 and is positioned above the bottom of the grooves 51 of the horizontal plate members 49 and 50 a sufficient distance to hold the undersurfaces of the belts slightly above the opposed surfaces of the plates 49 and 50, so that there is a slight clearance between such surfaces as shown in Figure 6 and the drag on the belt is reduced to a minimum.

The vertical plate members 46 and 47 are supported at their opposite ends on vertically disposed plate-like bracket members 57 of non-magnetic material having spaced vertical slots 58 in which the ends of the plate members 46 and 47 are secured and a top outwardly offset shoulder or flange portion 60. The frame side channel members 16 and 17 are provided on the inside faces thereof with longitudinally extending support rails or plates 61 on the supper edge of which the outer end bracket 57 for each magnet unit or assembly 43 is adapted to be secured by a bolt 62 extending through the bracket section 60. A longitudinally extending center beam 63 is supported on the cross braces 18 and the inner end bracket 57 for each magnet unit 43 is secured to a top flange thereof by a bolt 64 which extends through the bracket flange portion 60 and a spacer member 65. The center beam 63, of course, supports the inner ends of the lines of magnet units 43 for each of the two belts, the units in the two lines being aligned transversely of the conveyor frame. The bracket members 57 are each cut out at the top to receive end bearing members 66 for the belt supporting roller 56. The electromagnets may be readily removed from the individual assemblies 43 by removing the screws 48 so that they are interchangeable while the assemblies 43 are interchangeable in the conveyor, the spacing longitudinally being varied and horizontal plate members 50 of different width being provided as required.

Figure 5:
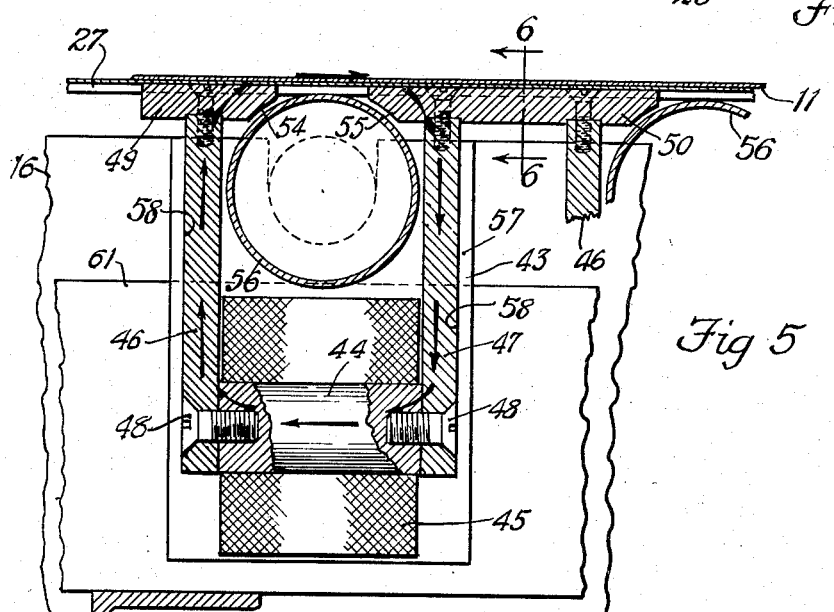
Figure 5 is a fragmentary cross section, to a still larger scale, taken on the line 5—5 of Figure 4.
Figure 8:
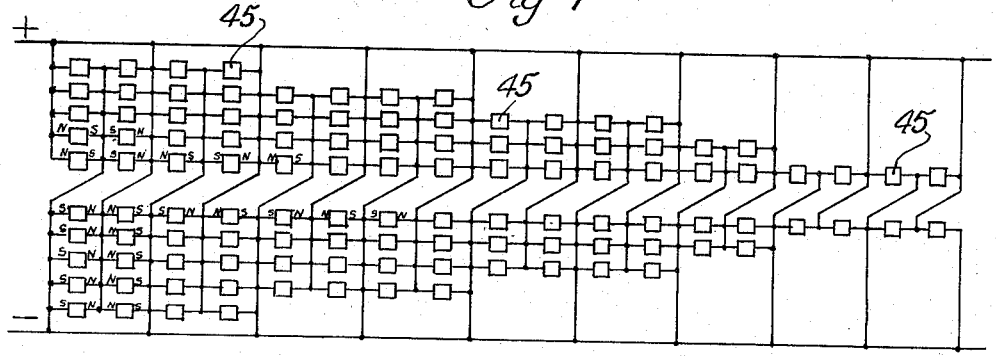
Figure 8 is a wiring diagram.

The arrangement of the belt supporting rollers 56 between the spaced edges of the horizontal pole plates 50 provides a flux path which is indicated by the arrows in Figure 5, with the belt supporting roller 56 being magnetically neutral and the work piece 11 bridging the gap between the plates 50. The number of electromagnets provided in each assembly 43, the arrangement of the assemblies on the frame, and the controls provided therefor are determined by the nature of the sheets or other work pieces 11 which the conveyor is required to handle. When the conveyor is employed as illustrated in Figure 1, the arrangement shown in Figure 3 is employed and the electromagnets are supplied with current as indicated in the schematic wiring diagram of Figure 8. The coils 45 of each assembly 43 are connected so that they have the same polarity while those of the next adjacent assembly are connected to provide reverse polarity as indicated by the letters N and S (Figure 8). The flow of magnetic flux is in the direction of the sheet length and the pull on the sheets will hold the latter straight without any tendency to sidewise movement. The magnets are more closely spaced and larger in number at the entrance end of the conveyor so as to grip the trailing ends of the sheets as they are delivered to the conveyor with sufficient initial pull to prevent shifting movement of the same on the surfaces of the belts 27. Since the sheets 11 are lapped on the conveyor 10 it is desirable to have the trailing ends of the sheets drop first from the overhead conveyor 12 and to this end an inducto switch or electric eye control, indicated at 70 (Figure 1) is provided on the frame of the conveyor 12 which is actuated by the passage of each successive sheet 11. The control 70 is connected in the circuit supplying current to the electromagnets in the overhead conveyor 12 and the electromagnets are grouped so that upon the passage of each sheet the control 70 operates to deenergize the magnets holding the trailing end of the sheet, when the latter reaches the dropping point, a short interval before deenergizing the magnets which hold the leading end of the sheet and the trailing end drops first onto the belts 27 and is gripped by the strong force of the magnets concentrated at the entrance end of the latter before the leading end of the sheet is released from the conveyor 12. This results in each sheet being initially gripped with a relatively strong force applied at the tailing end thereof and prevents movement of the sheet either sidewise or longitudinally while it is transferred to the conveyor 10 thus avoiding any marring of its surface or that of the preceding sheet with which it is overlapped. Further control of the pull exercised on the sheets by the magnets may be obtained by providing individual on and off switches in the lines supplying current to the individual coils 45.

While two belts 27 of equal width are shown in the illustrated conveyor, the number and width of the belts may be varied as required. The belts 27 are preferably formed of rubber which may be cast or machined to provide the grooved undersurface with the relatively thin areas or sections desired for efficient operation. Other belt material of a similar character may, of course, be used.

While particular materials and specific details of construction have been referred to in describing the embodiment of the invention which is herein illustrated, it will be understood that other materials and different details of construction may be resorted to within the scope of the invention, as defined in the appended claims.

I claim:

1. A magnetic conveyor for sheets of magnetic material comprising a supporting frame, belt supporting rollers at opposite ends of said frame, a continuous belt of substantial width carried on said rollers, said belt having a relatively plain outer surface for receiving thereon the sheets of material and an undersurface which is grooved to provide spaced areas of relatively thin belt section separated by areas of relatively thick belt section, and electromagnets arranged on said supporting frame with the pole pieces thereof connected at corresponding ends by flux conducting members which are spaced from each other in the lengthwise direction of the belt and which have portions extending into the grooves in the undersurface of the belt to provide a flux path extending through the areas of relatively thin belt section.

2. A magnetic conveyor comprising a supporting frame, belt carrying rollers at opposite ends of said supporting frame, a relatively wide belt carried on said rollers, said belt having a substantially plain work receiving outer surface, said belt having an undersurface which is longitudinally grooved to provide areas of different thickness, said belt carrying rollers being peripherally grooved to provide a supporting surface complementary to the undersurface of the belt, and a series of electromagnets positioned on said frame beneath said belt and having pole pieces arranged with portions underlying the belt and projecting into the grooves in the undersurface of the belt thereby to provide a flux path through the thin areas of the belt.

3. A magnetic conveyor comprising a pair of spaced side support rails having belt supporting rollers at opposite ends thereof, a relatively wide work carrying belt having a flat outer work receiving surface carried on said rollers, and a series of longitudinally spaced magnet assemblies extending between said side rails, each of said magnet assemblies extending between said side rails, each of said magnet assemblies comprising a plurality of electromagnets arranged in row forming relation and having pole members positioned in parallel relation in a horizontal plane and extending in a direction lengthwise of the conveyor, a pair of longitudinally spaced transversely extending vertical plates connecting the ends of the pole members, said vertical plates having transversely extending horizontal plates at their upper edges, said horizontal plates having a series of longitudinally extending transversely spaced grooves and separating rib formations in their upper surfaces, said work carrying belt having complementary grooves and rib formations in its under surface whereby relatively thin continuous belt areas overlie the rib portions of said horizontal planes and provide a minimum gap in the flux path through the work carried on said belt and said pole members.

4. A magnetic sheet conveyor comprising a supporting frame, spaced belt carrying members on said supporting frame, a relatively wide belt carried on said members, said belt having a substantially plain work receiving surface and having the undersurface thereof longitudinally grooved to provide alternate thick and thin areas, and a series of electromagnets positioned in spaced relation on said frame beneath said belt, said electromagnets having pole pieces arranged with portions thereof projecting into the grooves in the undersurface of the belt thereby to provide a flux path extending through a work piece positioned on the thin areas of the belt.

5. A conveyor for sheets of magnetic material comprising a supporting frame, belt supporting means at opposite ends of said frame, a continuous belt of substantial width supported thereon, said belt having a plain top surface for receiving thereon the sheets of material and an undersurface which is grooved to provide spaced areas of relatively thin belt section extending longitudinally of the belt which are seperated by rib-like relatively thick belt section and electromagnets arranged on said supporting frame which have pole pieces connected at corresponding ends by plate members which are spaced from each other and which have portions extending into the grooves in the undersurface of the belt to provide a flux path with a minimum gap through the areas of relatively thin belt section.

6. A conveyor for metal sheets comprising a supporting frame, belt supporting means at opposite ends of said frame, a continuous belt of substantial width mounted on said means, said belt having a relatively plain surface for receiving thereon the metal sheets and an undersurface which is grooved to provide spaced areas of relatively thin belt section separated by rib-like relatively thick belt section and electromagnets arranged on said supporting frame with the pole pieces thereof connected at corresponding ends by members underlying the belt which are spaced from each other and which have portions extending into the grooves in the undersurface of the belt to provide a flux path through the areas of relatively thin belt section.

7. A magnetic conveyor for sheets of magnetic material comprising a supporting frame, belt supporting rollers at opposite ends of said frame, a continuous belt of substantial width on said rollers, said belt having a relatively plain surface for receiving thereon the sheets of material and an undersurface which is grooved to provide spaced areas of relatively thin belt section separated by rib-like relatively thick belt section and electromagnets arranged on said supporting frame with the pole pieces thereof connected at corresponding ends by members underlying the belt which are spaced from each other and which have portions extending into the grooves in the undersurface of the belt to provide a flux path through the areas of relatively thin belt section.

8. A magnetic conveyor comprising a pair of spaced side rails having belt supporting rollers at opposite ends thereof, a work carrying belt of substantial width having a flat work receiving surface carried on said rollers, and a series of longitudinally spaced electromagnet assemblies beneath the upper run of said belt and supported by said side rails, each of said magnet assemblies comprising a plurality of electromagnets arranged in transverse rows and having their poles extending in parallel relation in a direction lengthwise of the conveyor, longitudinally spaced transversely extending vertical plates connecting the ends of the poles, said vertical plates terminating at their upper edges in transversely extending horizontal plates, said horizontal plates having a series of longitudinally extending transversely spaced grooves and separating rib formations in their upper surfaces, said work carrying belt having grooves in its under surface for receiving said rib formations whereby relatively thin continuous belt areas overlie said rib formations and provide a minimum gap in the flux path which extends through said poles, the plates connecting the ends thereof and a magnetic work piece on the work receiving surface of said belt.

9. A magnet assembly for a belt type magnetic conveyor comprising a pair of spaced pole plates, an electromagnet positioned between said pole plates with the ends of its pole connected to oppositely disposed faces of said pole plates adjacent one edge thereof, a second pair of pole plates connected to the opposite edges of said first pole plates and underlying a work carrying belt, said second pair of pole plates having parallel ribs on their outermost surfaces which extend into grooves provided in the undersurface of said work carrying belt, and a belt supporting roller mounted in the space between said second pair of pole plates.

10. A magnet assembly for a belt type magnetic conveyor comprising a pair of spaced pole plates, an electromagnet positioned between said pole plates with the ends of its pole connected to oppositely disposed faces of said pole plates adjacent one edge thereof, and a second pair of pole plates connected to the opposite edges of said first pole plates and underlying a work carrying belt, said second pair of pole plates having parallel ribs on their outermost surfaces which extend into longitudinal grooves provided in the undersurface of said work carrying belt.

11. A magnet assembly for a belt type magnetic conveyor comprising a pair of spaced pole plates, an electromagnet positioned between said pole plates and having a pole piece connected to oppositely disposed faces of said pole plates, a second pair of pole plates connected to the edges of said first pole plates in underlying relation to a work carrying belt, said second pair of pole plates having ribs on the outermost surfaces thereof which project into grooves provided in the undersurface of said work carrying belt, and a support member mounted in the space between said second pair of pole plates for carrying said belt.

12. A magnet assembly for a belt type magnetic conveyor comprising a pair of spaced vertical plates, an electromagnet positioned between said plates and having the ends of the pole thereof connected to oppositely disposed faces of said plates adjacent one edge thereof, and means on the upper edges of said plates adapted to underlie a work carrying belt, said means having parallel ribs on the uppermost surface which project into grooves provided in the undersurface of said work carrying belt.

References Cited in the file of this patent

UNITED STATES PATENTS 2,600,475     Buccicone              June 17, 1952